United States Patent [19]

Jay

[11] Patent Number: 5,015,001
[45] Date of Patent: May 14, 1991

[54] LOW FRICTION SEAL ASSEMBLY
[75] Inventor: Richard D. Jay, Plymouth, Mich.
[73] Assignee: Mather Seal Company, Milan, Mich.
[21] Appl. No.: 556,684
[22] Filed: Jul. 23, 1990
[51] Int. Cl.⁵ .................. B65D 53/00; F16J 15/32
[52] U.S. Cl. .................................. 277/37; 277/26; 277/38; 277/44; 277/152; 384/482
[58] Field of Search ................ 277/35, 37, 38, 39, 277/26, 44, 47, 95, 96.2, 152, 153; 384/477, 482

[56] References Cited
U.S. PATENT DOCUMENTS

| | | | |
|---|---|---|---|
| 3,135,518 | 6/1964 | Carson et al. | 277/37 |
| 3,341,265 | 9/1967 | Patterson | 277/37 |
| 3,472,254 | 10/1969 | Reed, Jr. et al. | 277/26 |
| 3,527,512 | 9/1970 | Miller | 277/95 |
| 3,685,841 | 8/1972 | Keller | 277/47 X |
| 4,208,057 | 6/1980 | Messenger | 277/37 |
| 4,252,329 | 2/1981 | Messenger | 277/153 X |
| 4,413,831 | 11/1983 | Washida et al. | 277/95 X |

Primary Examiner—William A. Cuchlinski, Jr.
Assistant Examiner—J. Folker
Attorney, Agent, or Firm—Lawrence J. Shurupoff

[57] ABSTRACT

A lubricant seal assembly adapted for installation in an annular clearance space between a shaft and a surrounding housing. The assembly includes inner and outer case members that can be press fit on the shaft and housing. An annular bumper element is arranged between confronting surfaces of the case members to limit excessive telescopic motion of the members during the installation process. The bumper element is formed of a fusible material, such that during an initial break-in period frictional heat melts some of the bumper material to quickly produce a low friction seal assembly.

11 Claims, 2 Drawing Sheets

U.S. Patent  May 14, 1991  Sheet 1 of 2  5,015,001

LOW FRICTION SEAL ASSEMBLY

BACKGROUND OF THE INVENTION

Technical Field

The present invention relates to radial lip seals and more particularly to unitized seals which seal between two relatively rotatable machine elements.

Brief Description of the Background Art

Radial lip seals are used in numerous rotating machine applications including wheel hubs, shaft journals and anti-friction bearings. A particular form of radial lip seal known as a unitized oil seal is preferred in certain applications because it protects the seal lips and minimizes the need for finishing the surfaces sealed by the unitized seal.

Unitized seals, which typically include an inner casing with an inner seal lip element and an outer casing with an outer seal lip element, are often installed as a unit within a bore in a wheel hub. The wheel hub is then mounted over an axle around which the seal lips form an annular sealing barrier. This mounting assembly generally involves some relative axial shifting of the inner and outer unitized seal casings and seal lip elements.

As the seal casings are axially shifted during installation, a significant axial load may be applied to the unitized seal and may result in metal-to-metal, metal-to-rubber or rubber-to-rubber contact between the inner and outer casings. Such contact can reduce seal lip life and cause an increase in torque required to rotate the unitized seal as the inner and outer casings rub against one another.

In order to prevent undesired frictional contacts between the inner and outer seal casings, prior unitized seals have used axially-extending elastomeric bumpers or nibs for axially spacing the inner seal casing from the outer seal casing. However, upon mounting the unitized seal within a housing and over a shaft, the axially-directed mounting forces will axially compress the bumpers or nibs between the inner and outer sealing casings. During the initial break-in period of the unitized seal, the nibs or bumpers on one seal casing must be worn away to eventually provide clearance or minimal contact between the bumpers and a locating surface on the other seal casing.

During the break-in period, the rubber nibs or bumpers generate significant resistance to rotation between the inner and outer casings. This resistance must be overcome by increasing the torque applied between the casings. Clearly, this increased resistance is undesirable from a vehicle efficiency viewpoint as additional energy is required to overcome the friction generated by the abrasion of the bumpers and nibs. Moreover, the heat and abraded seal particles produced by the friction can adversely affect the seal lip material and function. The abraded particles tend to migrate and collect beneath the seal lip and can result in seal leakage.

Because the nibs are initially compressed during installation, they subsequently expand axially during break-in thereby prolonging the time during which start-up torque must be increased to generate relative rotation between the shaft and bore being sealed. That is, as the nibs are worn away, they still maintain contact with the other seal casing as they axially expand to relieve their compression. This prolongs the break-in period. It has been attempted to alleviate this condition by coating the bumper surfaces with grease. However, the grease tends to migrate out of the seal assembly. Such grease migration has sometimes been misinterpreted as a seal failure, i.e., seal leakage.

A typical example of a unitized oil seal design is shown in U.S. Pat. No. 3,510,138 to Bowen which discloses in FIGS. 4 and 5 thereof the concept of providing a hard rubber surface on a unitized oil seal to minimize squealing of new seals when a seal case binds against an elastomeric portion of an oil seal. The hard rubber washer is bonded to the elastomeric body of the seal. If the seal of Bowen is assembled with excessive axial loading, the hard rubber washer will compress the elastomeric portion and result in increased torque being required to rotate the seal.

Another approach to reducing friction between adjoining seal elements is to place a washer formed of a low friction material between the seal elements to serve as a low friction thrust washer. Such an approach is taken in U.S. Pat. No. 3,761,099, to Hanson. Unfortunately, these low friction materials also abrade and migrate to the seal lips thus creating the potential for leakage problems noted above.

SUMMARY OF THE INVENTION

The present invention relates to a lubricant seal assembly that includes inner and outer annular seal casings adapted to have press fit engagements with a shaft and a surrounding housing. A resilient annular sealing element is carried by one of the members for rotary sliding engagement with the other member to prevent lubricant from escaping through the annular clearance space between the two members. An annular bumper element is located between axially confronting surfaces on the two seal members to limit relative axial movement of the members during the installation process.

The bumper element is formed of a material that is a solid at room temperature, but which transitions via friction to a liquid or vapor at the elevated temperatures associated with seal break-in operations. The bumper element melts away in a relatively short period of time due to a friction induced phase change. Thereafter, the seal assembly operates with minimal internal friction since contact between the casings is eliminated at the original site of the unmelted or solid bumper element as the melted bumper material recedes or flows away from the source of friction.

A primary object of the invention is to provide a seal assembly having a thrust accommodating member which prevents formation of abraded particles during initial break-in of the seal assembly.

Another object of the invention is to provide a seal assembly with a bumper element or annular thrust pad that quickly degrades, melts or sublimes via a phase change, such that the relatively rotating members of the seal assembly then operate with low friction losses without the presence of abraded particles which can adversely affect seal performance.

Another object is to provide an oil seal which is unaffected by minor variations in the axial alignment of the inner and outer portions of the seal casings which occur during installation of the seal.

Still another object is to prevent metal-to-metal contact between the inner and outer seal casings of a radial lip seal.

It is also an objective to provide an oil seal which runs at lower operating temperatures than conventional seals.

Another object is the elimination of the need for adding a lubricant between the bumper element and the associated friction surface.

These and other objectives are achieved and problems are overcome according to the radial lip oil seal of the present invention.

DETAILED DESCRIPTION

Figure 1:
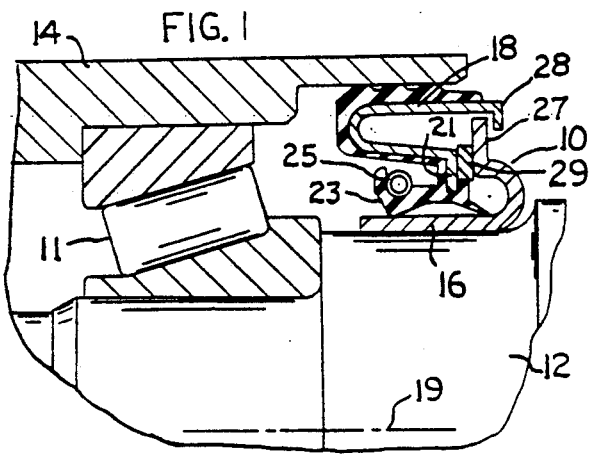
FIG. 1 is a fragmental schematic cross-sectional view of a wheel bearing fitted with a seal assembly constructed according to the present invention.

Referring now to FIG. 1, a unitized radial lip seal assembly 10 is located between a shaft 12 and a bore in an annular housing 14 for protecting, for example, an anti-friction bearing 11 against the escape of lubricant in a left-to-right direction. Shaft 12 can form part of a trailer axle, whereas housing 14 can form part of an associated road wheel, in which case the shaft is stationary and the housing is rotatable on the shaft.

The radial lip seal assembly 10 includes an inner metal case member 16 having a press fit on shaft 12, and an outer metal case member 18 having a press fit in the bore of housing 14. The housing is adapted for rotation around the shaft axis 19. The shaft 12 and housing 14 should be broadly construed to include two relatively rotatable machine elements.

Case member 18 includes a radial flange 21 that carries a resilient annular sealing element 23 thereon. A garter spring 25 biases the sealing element into rotary sliding engagement with an axially extending surface portion of inner case member 16.

Case member 16 includes a radially outwardly radiating flange 27 whose leftmost surface is in axial confronting relation to the right side surface of flange 21. An annular disk-like bumper element 29 is located between the two axially confronting flange surfaces. In the FIG. 1 arrangement element 29 is bonded or otherwise affixed to the right surface of flange 21. Alternatively, element 29 may be loosely fitted between the case members.

Before housing 14 is inserted onto shaft 12, the anti-friction bearings and associated lip seal assemblies can be press fit into bores in the housing. In actual practice these press fit operations are often performed without precision equipment. In many cases seal assembly 10 is merely forced into the right end of housing 14 by hammering on the exposed curved face of case member 16 until the seal assembly is partially or fully inserted into the bore in housing 14.

During installation, the press fit force between the seal assembly 10 and the housing 14 will be transmitted to bumper element 29 which acts as a protective spacer between the two case members. Thus, as housing 14 is moved onto the shaft in a left-to-right direction, the case member 18 of the seal assembly will experience frictional contact with the bore surface, due to press fit retarding the case member motion and causing an added axial force to be applied to annular bumper element 29. The bumper element will be axially squeezed so as to be in axial pressure engagement with the confronting surfaces on flanges 21 and 27.

When the seal assembly 10 is initially put into service, i.e. during its initial break-in period, bumper element 29 will offer frictional resistance to rotation of housing 14. In order to minimize the friction generated during this break-in period, the bumper element is formed of a material that is a solid at room temperature, but which transitions to a liquid at the elevated temperatures produced by the friction associated with this initial operation of the seal assembly.

As housing 14 rotates about shaft 12, the right face of bumper element 29 has sliding frictional engagement with the leftmost surface of flange 27 or the left face of bumper element 29 has sliding frictional engagement with the rightmost surface of flange 21, thereby generating heat at the bumper flange interface. The heat causes the material of bumper element 29 to liquify or sublime, thereby reducing the effective thickness of the bumper element. Thus, within a relatively short operational break-in period the bumper element recedes or flows away from its plane of initial frictional engagement through melting so that the bumper element no longer contacts the flange it is in relative rotation with or offers a significant frictional resistance to rotation of housing 14.

Bumper element 29 is preferably formed of a material having a melting point of approximately 180 degrees Fahrenheit. The exact melting point is not critical, since the frictional engagement between bumper element 29 and associated flange 27 will generate temperatures well above 180 degrees. This temperature will cause the material to melt away from the source of friction and provide a clearance between the seal flanges. Frictional contact with the bumper element is only required at its surface to produce significant material flow, as the retained heat in the bumper element is transferred to its sub-surface portions by conduction thereby melting these sub-surface portions without actual frictional engagement with the seal members.

A complete investigation of materials suitable for bumper element 29 has not been undertaken. However it is believed that suitable materials will include such materials as wax, paraffin and soap. These materials have melting points of approximately 180 degrees Fahrenheit. Additionally they would be compatible with most sealing element materials, in the sense that in the liquid state they would not degrade the commonly used sealing element materials. These bumper element materials are preferably non-compressible and tend to possess some inherent lubricity characteristics.

By reference to existing textbooks it appears that various other materials could be used to form bumper element 29, e.g. such materials as naphthalene, palmitic acid, stearic acid, methyl oxalate, methyl tartrate, trioxymethylene, aluminum nitride, lithium dihydrogen phosphate, soapstone, and various fatty materials having melting points in the desired temperature range from approximately 140 degrees to approximately 230 degrees. The preferred material will have a melting point of about 180 degrees. The material can, if desired, be formulated with known dry lubricants in powdered form, e.g. graphite and molybdenum disulfide.

This invention is concerned primarily with the fusible bumper element 29 and its operative disposition as an axial spacer in a lip seal assembly, acting to separate two members that may rotate relative to each other. The lip seal assembly, apart from the bumper element, can be of various different configurations. FIG. 1 shows one such configuration. FIGS. 2 through 8 are presented to illustrate different configurations and orientations that the bumper can take.

Figure 2:
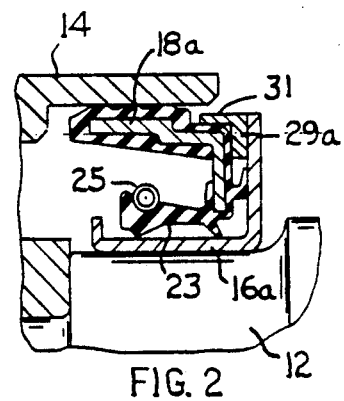
FIG. 2 is a fragmental cross-sectional view of an alternate embodiment of a radial lip seal constructed in accordance with the present invention.

FIG. 2 shows a seal assembly wherein bumper element 29a is formed as a flat radial disk element having an axially extending flange 31 encircling portions of the outer case member 18a. Flange 31 acts as a locator mechanism, such that the bumper element is enabled to be loosely positioned between the two case members at initial assembly in the factory. The bumper element does not have to be bonded or otherwise affixed to either case member.

Figure 3:
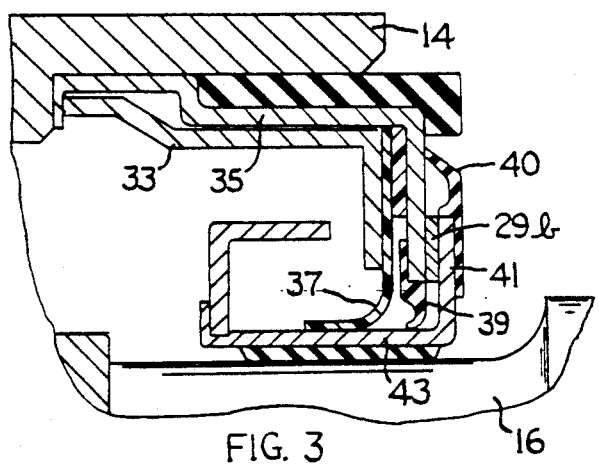
FIG. 3 is a fragmental cross-sectional view of another embodiment of a radial lip seal constructed in accordance with the present invention.

FIG. 3 shows a lip seal assembly wherein the outer case member comprises two annular elements 33 and 35 nested one within the other to operatively mount resilient sealing element 37. A resilient annular dust seal element 40 is bonded (molded) to flange 41 on the inner case member 43. In FIG. 3 the bumper element disk is shown at 29b.

Figure 4:
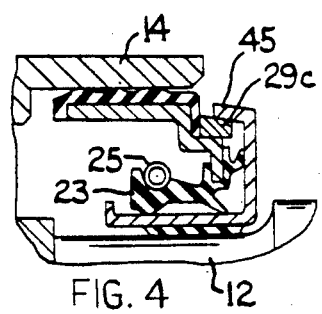
FIG. 4 is a fragmental sectional view of a further seal assembly constructed in accordance with the present invention.

FIG. 4 shows a lip seal assembly wherein a novel annular bumper element 29c is configured as a wedge element between two axially extending confronting surfaces of the inner and outer case members. As the case members move axially toward a fully telescoped condition the bumper element becomes wedged between the two members. During the break-in period bumper element 29c will be in frictional contact with an inturned flange 45 on the inner case member, thereby generating heat to melt the bumper element and thus lower the frictional resistance offered by the seal assembly.

Figure 5:
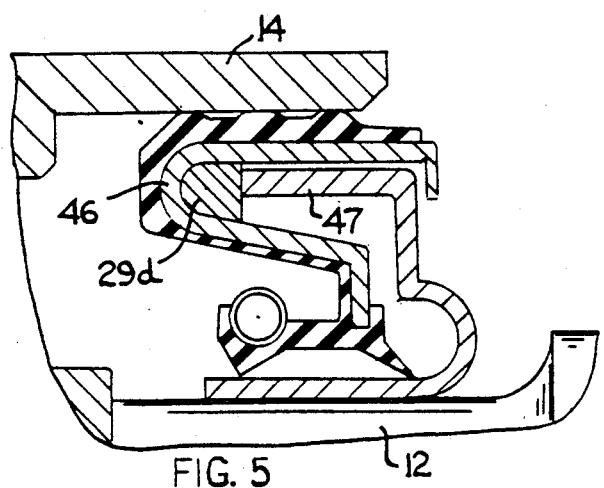
FIGS. 5 through 8 are fragmental sectional views taken in the same direction as FIG. 1, but illustrating other forms that the invention can take.

FIG. 5 shows a lip seal assembly wherein the fusible bumper element 29d is located within a channel cross-sectioned wall 46 that forms part of the outer case member. The right surface of element 29d is adapted to have pressure contact with the free end edge of an axially-extending flange 47 that forms part of the inner case member for the lip seal assembly.

Figure 6:
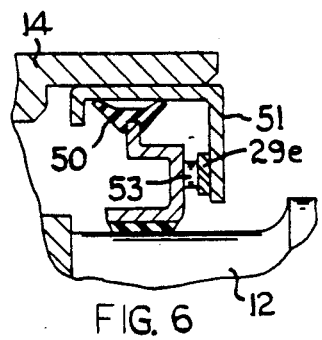

In the arrangements of FIGS. 1 through 5 the resilient sealing elements are in each case carried on the outer case member, i.e. the case member affixed to housing 14. FIG. 6 shows an arrangement in which the resilient sealing element 50 is carried on the inner case member. In the FIG. 6 arrangement bumper element 29e comprises an annular disk affixed to a flange 51 constituting part of the outer case member. A series of circumferentially spaced buttons 53 are formed as integral parts of bumper element 29e for frictional engagement with an axially confronting surface on the inner case member.

Figure 7:
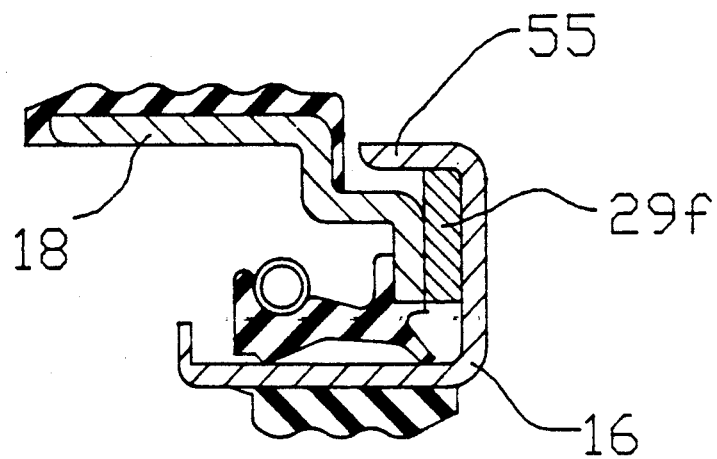
Figure 8:
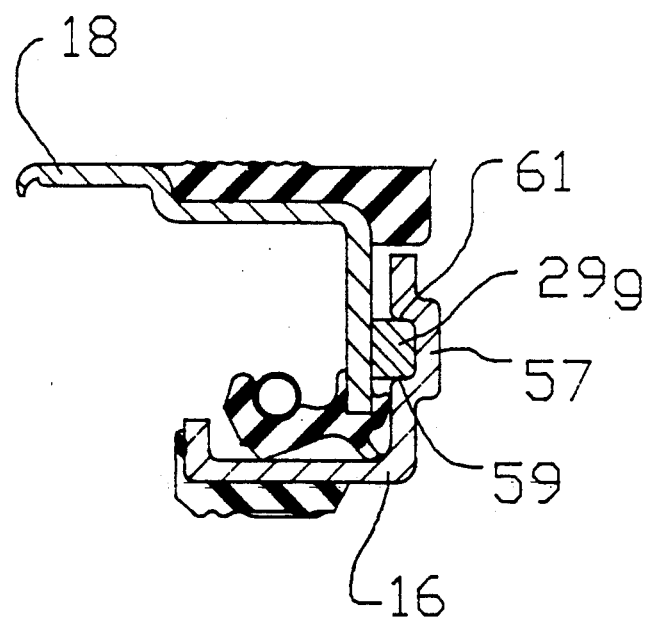

As seen in FIG. 7, annular bumper element 29f is radially located by axial flange 55 formed on the outer diameter of the inner case member 16. In FIG. 8, the annular bumper element 29g is axially nested within an annular pocket 57 formed in the inner case member 16. Pocket 57 provides inner and outer axially extending radial support surfaces 59, 61 against which the bumper element 29g is radially supported and centered.

The fusible bumper element material is preferably non-compressible in order to minimize the amount of material that is required to be melted (or vaporized) before attainment of a friction-free seal case condition.

In this connection it will be appreciated that if a compressible material, e.g. an elastomer or various resilient plastics, were used for the bumper element the wearing-away process would be prolonged, due to the fact that the material would expand to maintain itself in frictional engagement with the associated confronting surface.

The use of a fusible material for the bumper element materially shortens the break-in period. This is particularly the case when the bumper element is formed of a wax-like material having lubricity characteristics. With the bumper element construction of the present invention no grease is required.

The break-in period is relatively short, and there is no grease flow out of the seal that could be interpreted as a seal failure. The fusible material tends to immediately solidify after it has been initially melted and separated from the bumper element. The solidified material coats the adjacent surfaces of the seal assembly.

To those skilled in the art to which this invention relates, many changes in construction and engineering applications of the invention will suggest themselves without departing from the scope of the invention. The scope of the invention is defined by the following claims and should not be limited by the preceding descriptions of specific embodiments of the invention. More particularly, any multi-piece seal assembly, whether unitized or non-unitized, which may be subject to axial contact and/or relative rotation forces may be fitted with a fusible bumper element to achieve the advantages discussed above.

What is claimed is:

1. A lubricant seal assembly comprising an outer annular case member and a cooperating inner annular case member, said case members being rotatable relative to one another; an annular sealing element carried by one of said case members for rotary sliding engagement with the other member, said inner and outer case members having confronting surfaces; and, an annular bumper element located between said confronting surfaces, such that an installation force applied to one of said case members will cause said bumper element to be in pressure engagement with said confronting surfaces; said bumper element being formed of a material which is a solid at room temperature, but which undergoes a friction-induced phase change at an elevated transition temperature associated with break-in operation of the seal assembly.

2. The assembly of claim 1, wherein the transition temperature of the bumper element material is approximately 150 degrees Fahrenheit.

3. The assembly of claim 1, wherein said bumper element is formed of a material selected from the group consisting of wax, paraffin, soap, naphthalene, palmitic acid, stearic acid, methyl oxalate, methyl tartrate, trioxymethylene, aluminum nitride, lithium dihydrogen phosphate, soapstone, and fatty materials having melting points of approximately 180 degrees Fahrenheit.

4. The assembly of claim 1, wherein said bumper element is an annular disk having two parallel flat radial end faces; said bumper element having its end faces engaging the annular confronting surfaces on the inner and outer case members.

5. The assembly of claim 4, wherein said bumper element comprises an axially extending flange encircling portions of said outer case member to operatively position the bumper element.

6. The assembly of claim 1, wherein said bumper element is an annular disk having a series of circumferentially spaced buttons extending axially therefrom; one of said axially confronting surfaces being engaged with the buttons; the other axially confronting surface being engaged with the disk remote from the buttons.

7. The assembly of claim 1, wherein said outer case member includes an annular channel cross-sectioned wall, the web surface of which forms one of said axially confronting surfaces; said bumper element being located within the annular space circumscribed by said channel cross-sectioned wall.

8. The assembly of claim 7, wherein said inner case member includes an annular axially-extending flange; the free edge of said axially-extending flange forming the other axially-confronting surface.

9. The assembly of claim 1, wherein the outer case member comprises two annular elements nested one within the other.

10. The assembly of claim 9, wherein the sealing element comprises a fluoropolymer material.

11. The assembly of claim 10, wherein the fluoropolymer material comprises a filler material.

* * * * *